(12) United States Patent
Wishneusky

(10) Patent No.: US 6,826,676 B2
(45) Date of Patent: Nov. 30, 2004

(54) EXTENDING IMMEDIATE OPERANDS ACROSS PLURAL COMPUTER INSTRUCTIONS WITH INDICATION OF HOW MANY INSTRUCTIONS ARE USED TO STORE THE IMMEDIATE OPERAND

(75) Inventor: John A. Wishneusky, Fitzwilliam, NH (US)

(73) Assignee: Intel Corporation, Santa Clara, CA (US)

(*) Notice: Subject to any disclaimer, the term of this patent is extended or adjusted under 35 U.S.C. 154(b) by 475 days.

(21) Appl. No.: 09/989,207

(22) Filed: Nov. 19, 2001

(65) Prior Publication Data

US 2003/0097543 A1 May 22, 2003

(51) Int. Cl.$^7$ ............................................... G06F 9/312
(52) U.S. Cl. ................................................... 712/210
(58) Field of Search ......................................... 712/210

(56) References Cited

U.S. PATENT DOCUMENTS 4,975,828 A 12/1990 Wishneusky et al. ....... 364/200

FOREIGN PATENT DOCUMENTS

JP 4 08-161169 * 6/1996

* cited by examiner

Primary Examiner—Richard L. Ellis
(74) Attorney, Agent, or Firm—Fish & Richardson P.C.

(57) ABSTRACT

A programmable processing system includes a first processor for executing a first portion of an instruction, a second processor for executing a second portion of the instruction, where the second portion of the instruction is interpreted by the first processor as an extension to an immediate operand field included in the first portion of the instruction.

23 Claims, 2 Drawing Sheets

EXTENDING IMMEDIATE OPERANDS ACROSS PLURAL COMPUTER INSTRUCTIONS WITH INDICATION OF HOW MANY INSTRUCTIONS ARE USED TO STORE THE IMMEDIATE OPERAND

TECHNICAL FIELD

This invention relates to using an immediate operand in a computer instruction.

BACKGROUND

Integrated processor design generally involves a tradeoff in the size of the logic area devoted to processor logic and the area devoted to memory. Therefore the overall width (i.e., the number of bits) of a particular processor's instructions is limited by the available width of the instruction memory. The individual bits of a processor instruction are interpreted by decode logic. A portion of an instruction is used to control processor operations (the "control field") and a portion of the instruction is used as an address of an operand (the "address field"). For example, an address field may contain an address of a register containing an operand. An alternative way of providing an operand for processing is the use of an "immediate operand", i.e., using the address field of an instruction to store the actual operand. Therefore, the length of an immediate operand is limited by the width of the address field of an instruction.

DESCRIPTION

Figure 1:
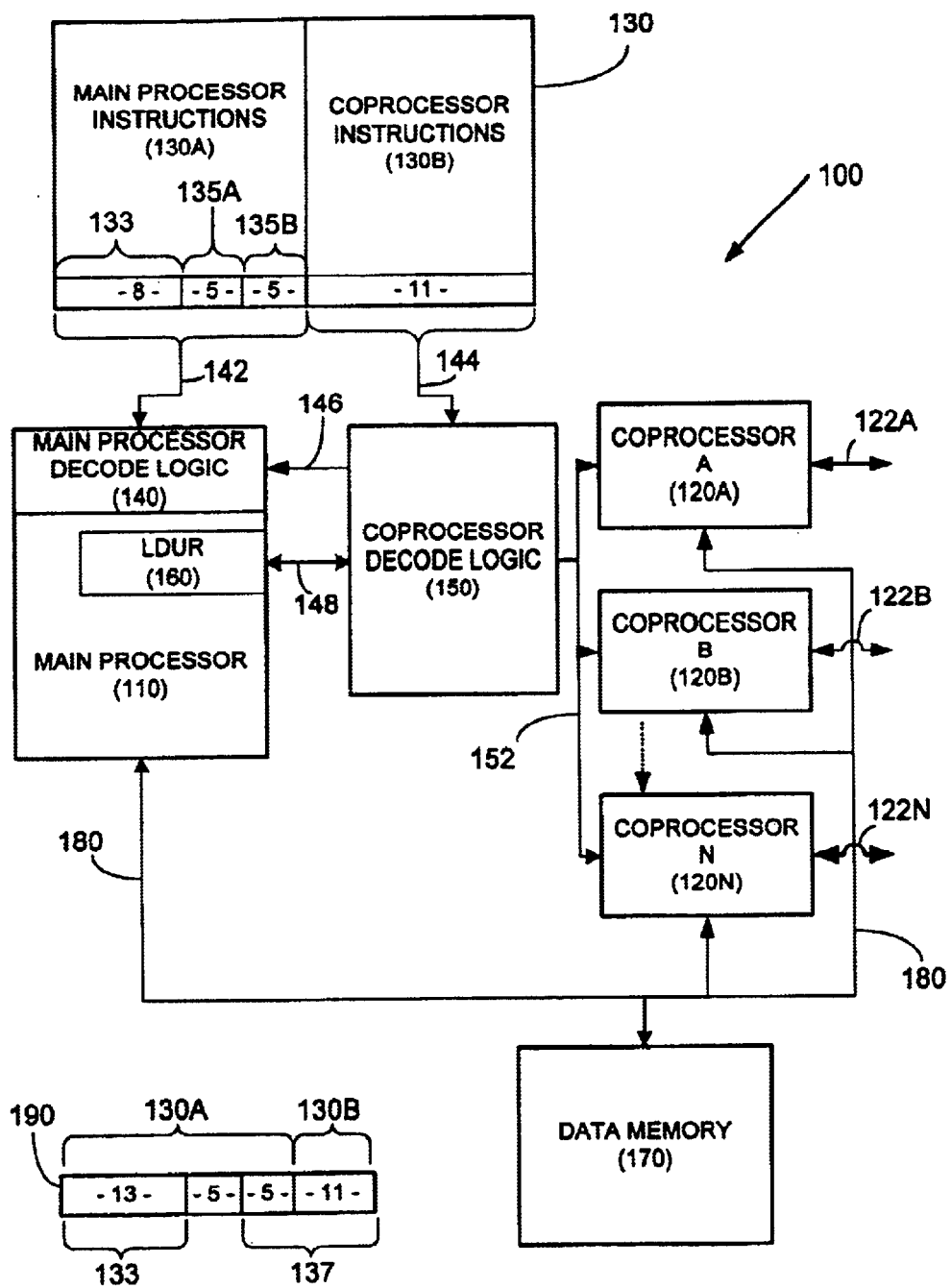
FIG. 1 shows a block diagram of a computer processor.

Referring to FIG. 1, a computer processor 100 includes a main processor 110 and a set of coprocessors 120a–120n. Computer processor 100 includes a data memory 170 for holding operands and data and a common data bus 180 to connect data memory 170 to main processor 110. The common control bus connects each of coprocessors 120a–120n to the processor. Processor 100 includes an instruction memory 130 for holding instructions for both main processor 110 and coprocessors 120a–120n. The processor includes main processor decode logic 140 for decoding and executing instructions for main processor 110. Processor 100 includes coprocessor decode logic 150 for decoding and executing instruction for coprocessors 120a–120n.

Instruction memory 130 holds both main processor instructions 130a and coprocessor instructions 130b that are sent as a "divided instruction stream" (130a and 130b) to main processor decode logic 140 over main instruction bus 142 and to coprocessor decode logic 150 over coprocessor instruction bus 144, respectively. Main processor instructions 130a and main instruction bus 142 are, e.g., 18-bits wide while coprocessor instructions 130B and coprocessor instruction bus 144 are, e.g., 11-bits wide.

Coprocessors 120a–120n are each connected to receive control signals from coprocessor decode logic 150 over control signal bus 152. Coprocessors 120a–120n are also connected to transmit and receive data over input/output buses 122a–122n, respectively. A common clock signal (not shown) is connected to main processor 110 and coprocessors 120a–120n. The divided instruction stream 130a and 130b allows the main processor 110 and selected one or more of the coprocessors to perform independent processing operations that may be synchronized to the common clock signal. For example, a divided instruction may cause coprocessor 120a to input data placed onto common data bus 180 by main processor 110 and transmit that data on input/output bus 122a.

The main processor instructions 130a include, for example, a control field 133 that is 8-bits wide, a operand destination address field 135a that is 5-bits wide and a operand source address field 135b that is 5-bits wide. Main processor instructions, as specified by the control field 133, include "immediate addressing" (IA) instructions that may specify the source address field 135b as an immediate operand. To provide an immediate operand to main processor 110 that is longer than the 5-bit source address field 135b, processor 100 includes a "prepare long immediate" (PLI) coprocessor instruction 130B. PLI instruction allows main processor 110 to combine the 5-bit source address field 135b of the main processor instruction 130A with one or more of the 11-bits of the coprocessor instruction 130B. In operation, before an IA instruction is executed by main processor 110, a PLI instruction is sent and executed by coprocessor decode logic 150. PLI instruction includes a long immediate duration value, "N", that specifies the number of coprocessor instructions 130B that coprocessor decode logic 150 will inhibit or will be inhibited from decoding following the execution of the PLI instruction. Therefore, "N" specifies the number of main processor instructions 130A, which may include an IA instruction, that will combine the coprocessor instruction field 130B with the main processor instruction source operand address field 135b.

In processor 100, the long immediate duration field contained within a PLI instruction is three (3) bits long. Therefore, the "N" value can range from one (1) to seven (7). Other length long immediate duration fields could be used, and therefore, other "N" values could be used of course. The PLI instruction causes coprocessor decode logic 150 to pass the "N" value over bus 148 to main processor 110. Main processor 110 stores "N" in a long immediate duration register 160 (LDUR). LDUR 160 is a decrementing register, e.g., a counter. LDUR 160 decrements the long immediate duration value "N" by one (1) with the execution of each successive instruction by main processor 110. The decremented "N" is passed back to coprocessor decode logic 150 over bus 148. As long as "N" has not reached zero (0), the coprocessor decode logic 150 will inhibit or will be inhibited from decoding the coprocessor instruction 130b. Instead, coprocessor decode logic 150 will pass the entire 11-bit coprocessor instruction 130b to main processor decode logic 140 over bus 146. Therefore, for "N" clock cycles following the PLI instruction the coprocessor instruction 130B may be used as part of an immediate operand included in a main processor IA instruction 130A.

Still referring to FIG. 1, an exemplary IA instruction 190 is shown. IA instruction 190 combines the 5-bit source operand address field 135b of main processor instruction 130a together with the coprocessor instruction 130b to form an immediate operand 137, as large as 16-bits wide for use by main processor 110. The IA instruction capability available to processor 100 uses the 11-bits of coprocessor instruction 130b, which might otherwise be unused, for example, when coprocessors 120a–120n are either idle, or otherwise occupied and unable to utilize coprocessor instruction 130b. Furthermore, the IA instruction reduces the need to store longer constants, that is, the longer operands that would otherwise need to be stored can instead be included as part of an IA instruction. Please realize that although a LDUR-N value is non-zero, a main processor instruction 130a being executed by main processor 110 may not necessarily use the coprocessor instruction field 130B sent by coprocessor decode logic 150 to main processor 110.

In the embodiments discussed above, the execution of instructions 130a and 130b was described as sequential, with a single stream of instructions (a "context") being executed from start to finish before the start of a new context. However, in an alternate embodiment, processor 100 is configured to execute multiple-contexts, each of which may be executed in part before completion of a previous context. In this case, additional logic is required to manage the context scheduling and to maintain the hardware and register states for each context that may be swapped in or out for execution by main processor 110 and coprocessors 120a–120n.

Figure 2:
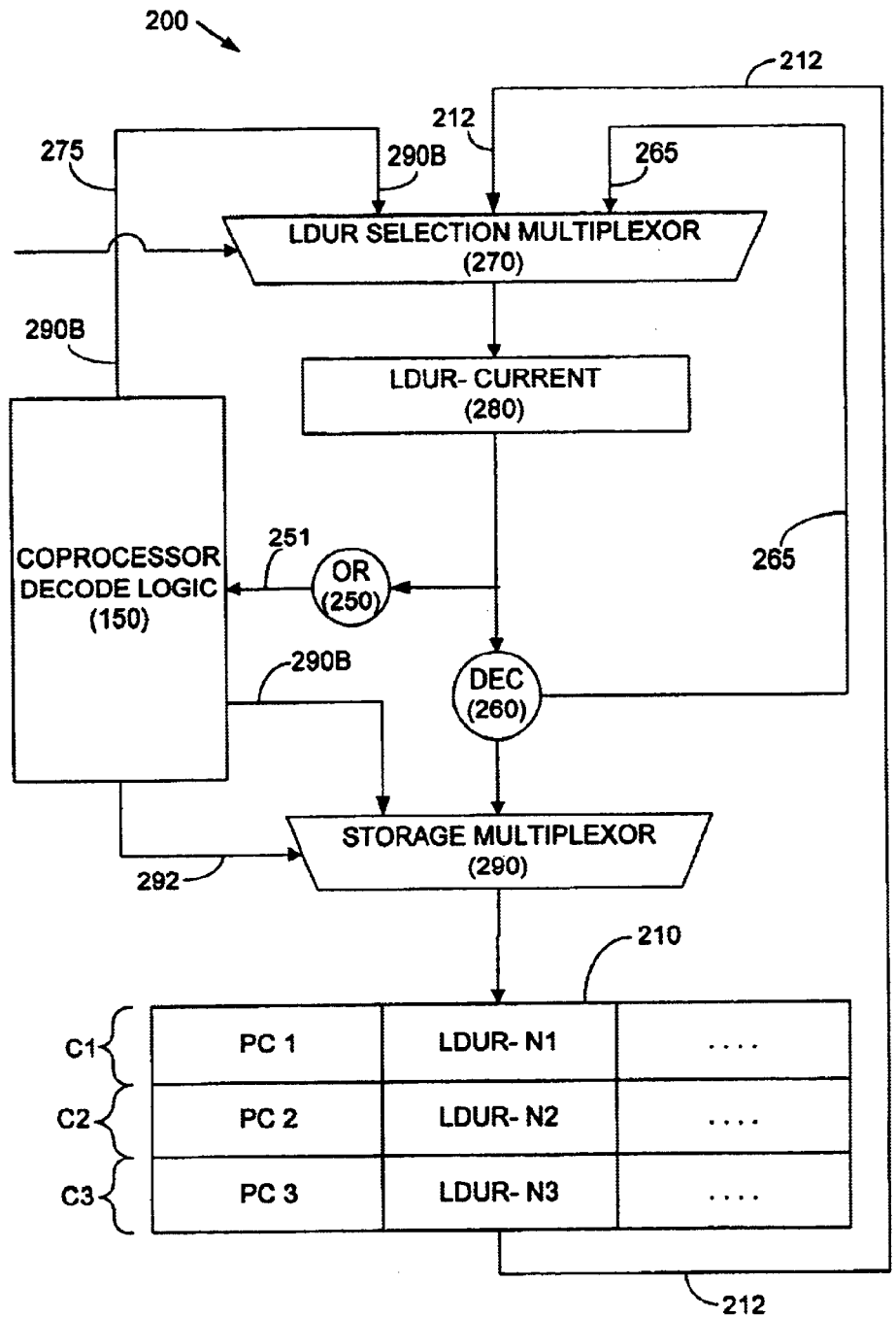
FIG. 2 shows a logic diagram for a register storage and decrement circuit.

Referring to FIG. 2, a register decrement and context storage circuit 200 is used to maintain context information in a multiple-context processor 100. Circuit 200 includes an executing context stack (ECS) 210 for storing context information for each context C1–C3, e.g., program counters PC1–PC3. In order to allow the IA instruction capability in multiple-context processor 100, ECS 210 also includes the LDUR-N values (LDUR-N1 through LDUR-N3), if any, that were included in a PLI instruction previously executed by a corresponding context C1–C3. Therefore as contexts are swapped in for execution by processor 100, the LDUR-N values stored in ECS 210 are used to allow the appropriate number of IA instructions to execute as long as LDUR-N is greater than zero (0).

In operation, a PLI instruction included in an executing context is decoded by coprocessor decode logic 150, causing the included LDUR-N value to be output by coprocessor decode logic 150 to storage multiplexor 290 on bus 290b and to selector multiplexor 270 on bus 290a. Since this is a "new" LDUR-N value, that is, from a new PLI instruction, control line 292 is asserted. Assertion of control line 292 causes storage multiplexor 290 to store the new LDUR-N value into the appropriate ECS 210 location for the current context. Context scheduling logic (not shown) sends selection signals on lines 275 to LDUR Selector Multiplexor 270. Selection signals 275 cause the appropriate LDUR value being input to Selector Multiplexor 270 to be output to a LDUR-CURRENT register 280. LDUR-CURRENT register 280 is input to an OR 250 logic block, which causes a bit-wise logical-OR of all of the bits contained in LDUR-CURRENT register 280. Output 251 of OR logic block 250 is input to coprocessor decode logic 250 to indicate to coprocessor decode logic 150 whether or not to inhibit coprocessor decoding of the current coprocessor instruction 130B and to pass the coprocessor instruction 130B to main processor 110 for possible use as an immediate operand. More specifically, if output 251 of OR logic block 250 is a one (1), LDUR-CURRENT is not zero (0) and an IA instruction may be executed by main processor 110. LDUR-CURRENT register 280 is also input to decrement logic block DEC 260, which decrements the LDUR-CURRENT register 280 value by one (1) and sends the decremented LDUR-N value to storage multiplexer 290. In this case, the decremented LDUR-N value will be stored in the appropriate ECS 210 context location since a new LDUR-Nvalue is not being input from coprocessor decode logic 150. In the case of a context swap, a stored LDUR-N value from ECS 210 is output over bus 212 to selector multiplexor 270.

Selection signals 275 select the LDUR-N value input to LDUR selector multiplexor on bus 212 for use as LDUR-CURRENT 280. The LDUR-CURRENT register 280 may be loaded by three different sources that are input to LDUR Selection Multiplexor 270: a just decoded LDUR-N from the coprocessor decode logic, input on bus 290B; a just decremented LDUR-N value from a bypass bus 265; or a stored LDUR-N value from ECS 210. Other LDUR decrement and context storage circuits may be implemented to maintain LDUR values for multiple contexts.

Though specific embodiments have been described other ways to implement the features of those embodiments are possible. For example, a long immediate duration value "N" could be defined by a bit field that is longer than 3-bits, and therefore could allow more than seven (7) IA instructions in succession. Also, the combined long immediate operand described was 16-bits in total length, however, different embodiments of an instruction memory and/or different instruction control field lengths could be implemented to achieve different operand lengths. Also an execution control stack can include context information for three (3) pending contexts, however, the execution control stack could be made smaller or larger to handle fewer or more contexts.

Please realize that the combined immediate operand length may be less than or more than the combined 16-bit length discussed previously. More specifically, system 100 may include instructions that cause main processor 110 to perform operations on operands of a variety of sizes, for example, operands of 8-bits, 16-bits or 32-bits. If an instruction indicates an 8-bit operation is to be performed, the 8 least significant bits of the combined immediate 16-bit operand are used and the upper 8 are ignored. If an instruction indicates a 16-bit operation is to be performed, all 16 bits of the combined immediate operand are used as the operand. If an instruction indicates a 32-bit operation is to be performed, the 16-bits of the combined immediate operand are used as the least significant bits (the lower 16-bits) of the operand and the most significant bits (the upper 16-bits) are forced to zero (0).

Furthermore, multiple IA instructions may be executed in succession to provide immediate operands that are longer than the combined 16-bit IA operand field. More specifically, a first IA instruction having a first 16-bit immediate operand field may be executed that stores the first 16-bit operand in a register, for example. A second IA instruction having a second 16-bit immediate operand field is then executed that is combined with the stored first 16-bit immediate operand field to produce a 32-bit operand.

In an alternate embodiment, a method of enabling combined immediate operands could be implemented. More specifically, one or more coprocessor instruction bits (or one or more additional coprocessor instruction bits) are used as part of a PLI instruction that specifies a "set long immediate mode" but without specifying any LDUR value. The "set long immediate mode" instruction causes coprocessor decode logic to "enable" subsequent coprocessor instructions decoding to be inhibited, as discussed previously. The long immediate mode would then be "disabled" by performing a coprocessor instruction that specifies "stop long immediate mode". The "enable" and "disable" function could be implemented, for example, by the setting or clearing of an enable/disable bit. Furthermore, two coprocessor instruction bits could be used to indicate and control the position of the 16-bits of a combined immediate operand value within a 32-bit operand.

A number of embodiments of the invention have been described. Nevertheless, it will be understood that various modifications may be made without departing from the spirit and scope of the invention. Accordingly, other embodiments are within the scope of the following claims.

What is claimed is:

1. A programmable processing system comprising:
   a first processor for executing a first portion of an instruction; and
   a second processor for executing a second portion of the instruction, the second portion of the instruction interpreted by the first processor as an extension to an immediate operand field included in the first portion of the instruction to define a larger immediate operand field, wherein before the second portion of the instruction is interpreted by the first processor a previous instruction is interpreted by the second processor that indicates a number of instructions after the previous instruction that may be interpreted by the first processor as an extension to the immediate operand field.

2. The system of claim 1 further comprising:
   a device for storing the number of instructions and decrementing the number stored with the number being decremented once for each instruction executed by the first processor.

3. The system of claim 2 further comprising:
   decode logic to decode control fields of the instructions for the second processor, with the decoding logic interpreting the previous instruction and storing the number of instructions indicated by the instruction as a value in a register.

4. The system of claim 3, wherein said decoding logic receives the value stored in the register and outputs the second portion of the instruction to the first processor if the stored value is not zero.

5. The system of claim 4, wherein said decoding logic decodes the second portion of the instruction and controls the second processor if the value stored in the register is zero.

6. The system of claim 5, wherein said first processor and said second processor execute multiple contexts.

7. The system of claim 6 further comprises:
   an execution control stack that includes a storage area for the remaining number of instructions for at least one context.

8. The system of claim 4, wherein the decrementing circuit further comprises:
   an OR logic block that receives the stored register value for the current context and outputs a signal to the second processor to indicate if the current instruction may be interpreted as a long immediate extension by the first processor if any of the bits of the register value are equal to one.

9. A computer program product store on a computer readable medium comprising instructions for causing a computer to:
   interpret a first portion of an instruction by a first processor;
   interpret a second portion of the instruction by a second processor as an extension to an immediate operand field included in the first portion of the instruction to define a larger immediate field; and
   interpret a second portion of a previous instruction by the second processor that indicates a number of instructions which may thereafter be interpreted by the first processor as an extension to the immediate operand field of the first processor instruction.

10. The computer program product of claim 9 wherein interpreting the second portion of said previous instruction causes the number of instructions to be stored in a register.

11. The computer program product of claim 10 wherein said instructions causing a computer to interpret the second portion of the instruction further comprises instructions causing a computer to:
    decrement the stored value in the register.

12. The computer program product of claim 11 wherein said instructions causing a computer to interpret a second portion of the instruction by a second processor as an extension to an immediate operand field further comprises instructions causing a computer to:
    send the second portion of the instruction to the first processor if the stored value in the register is not zero.

13. The computer program product of claim 10 wherein said instructions causing a computer to interpret the second portion of the instruction further comprises instructions causing a computer to:
    OR the bits stored in the register; and
    send a signal to a decode logic for the second processor indicating that a bit was set in the register.

14. The computer program product of claim 10 wherein interpreting the second portion of said previous instruction causes the number of instructions to be stored in an execution control stack.

15. A programmable processing system comprising:
    a first processor for executing a first portion of an instruction; and
    a second processor for executing a second portion of the instruction, wherein the second portion of the instruction is interpreted by the first processor as an extension to an immediate operand field included in the first portion of the instruction to define a larger immediate operand field, and
    wherein before the second portion of the instruction is interpreted by the first processor a previous instruction is interpreted by the second processor to enable the extension to the immediate operand field.

16. The system of claim 15 further comprising:
    decode logic to decode control fields of the instructions for the second processor, with the decoding logic interpreting the previous instruction and setting a bit to indicate the extension to the immediate operand field.

17. The system of claim 16, wherein said decoding logic outputs the second portion of the instruction to the first processor if the bit is set.

18. The system of claim 17, wherein said decoding logic decodes the second portion of the instruction and controls the second processor if the stored bit is cleared.

19. The system of claim 18, wherein said first processor and said second processor execute multiple contexts.

20. The system of claim 19 further comprises:
    an execution control stack that includes a storage area for the remaining number of instructions for at least one context.

21. A computer program product store on a computer readable medium comprising instructions for causing a computer to:
    interpret a first portion of an instruction by a first processor;
    interpret a second portion of the instruction by a second processor as an extension to an immediate operand field included in the first portion of the instruction to define a larger immediate field; and
    interpret a second portion of a previous instruction by the second processor that indicates subsequent instructions may be interpreted by the first processor as an extension to the immediate operand field of the first processor instruction.

22. The computer program product of claim 21 wherein interpreting the second portion of said previous instruction causes the setting of a bit.

23. The computer program product of claim 22 wherein said instructions causing a computer to interpret a second portion of the instruction by a second processor as an extension to an immediate operand field further comprises instructions causing a computer to:

send the second portion of the instruction to the first processor if the stored bit is set.

* * * * *